United States Patent [19]

Arnold et al.

[11] Patent Number: 5,140,092

[45] Date of Patent: Aug. 18, 1992

[54] RIGID-ROD BENZIMIDAZOLE PENDANT BENZOBISAZO POLYMER

[75] Inventors: Fred E. Arnold; Loon-Seng Tan, both of Centerville; Thuy D. Dang, Dayton, all of Ohio

[73] Assignee: The United States of America as represented by the Secretary of the Air Force, Washington, D.C.

[21] Appl. No.: 686,205

[22] Filed: Apr. 16, 1991

[51] Int. Cl.$^5$ .................. C08G 73/18; C08G 73/32; C08G 73/22
[52] U.S. Cl. ............................ 528/183; 528/337; 528/341; 528/342
[58] Field of Search ............... 528/183, 337, 341, 342

[56] References Cited

U.S. PATENT DOCUMENTS

| | | | |
|---|---|---|---|
| 4,892,921 | 1/1990 | Tsai et al. | 528/183 |
| 4,892,953 | 1/1990 | Arnold et al. | 548/156 |

Primary Examiner—Harold D. Anderson
Attorney, Agent, or Firm—Charles E. Bricker; Donald J. Singer

[57] ABSTRACT

Provided is a para-ordered aromatic heterocyclic polymer having repeating units of the formula —(—Q—Ar—)— wherein Q is

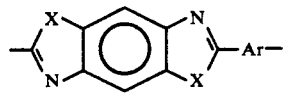

or

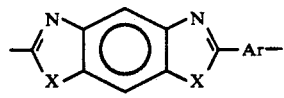

wherein X is —O—, —NH— or —S—, and wherein Ar is

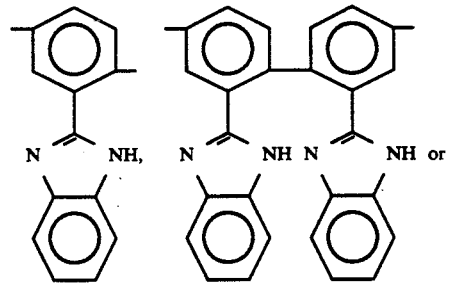

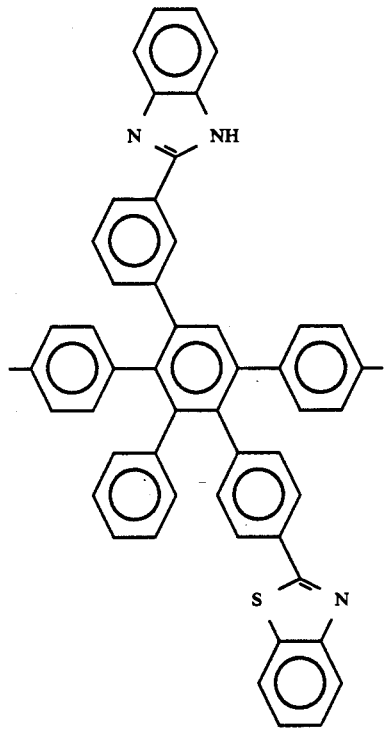

4 Claims, No Drawings

RIGID-ROD BENZIMIDAZOLE PENDANT BENZOBISAZO POLYMER

RIGHTS OF THE GOVERNMENT

The invention described herein may be manufactured and used by or for the Government of the U.S. for all governmental purposes without the payment of any royalty.

BACKGROUND OF THE INVENTION

This invention relates to para ordered aromatic polymers containing pendant benzimidazole groups.

In general, the class of aromatic heterocyclic extended chain polymers are well known for their outstanding thermal, physical and chemical properties. These polymers generally exhibit excellent modulus and tenacity properties.

Tsai et al, U.S. Pat. No. 4,892,921, disclose that the aromatic heterocyclic extended chain polymers lack good properties when in compression. Tsai et al disclose para-ordered aromatic heterocyclic extended chain polymers having pendant benzoxazole and benzothiazole groups which have good properties when in compression.

Arnold et al, U.S. Pat. No. 4,892,953, disclose phenylbenzthiazole-substituted diacid terphenyl monomers which are used for making aromatic heterocyclic extended chain polymers which exhibit improved compressive properties.

We have prepared new para-ordered aromatic benzimidazole-pendant polymers which, when treated with phosphoric acid, exhibit improved thermooxidative stability as compared to alkaline treated polymers.

Accordingly, it is an object of the present invention to provide novel para-ordered aromatic heterocyclic polymers containing pendant benzimidazole groups.

It is another object of the present invention to provide methods for preparing these para-ordered aromatic heterocyclic polymers.

Other objects, aspects and advantages of the present invention will become apparent to those skilled in the art from a reading of the following detailed description of the invention.

SUMMARY OF THE INVENTION

In accordance with the present invention, there are provided polymers having repeating units of the formula:

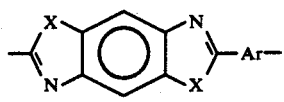

or

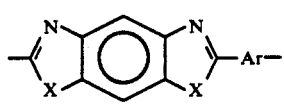

wherein X is —O—, —NH— or —S—, and wherein Ar is

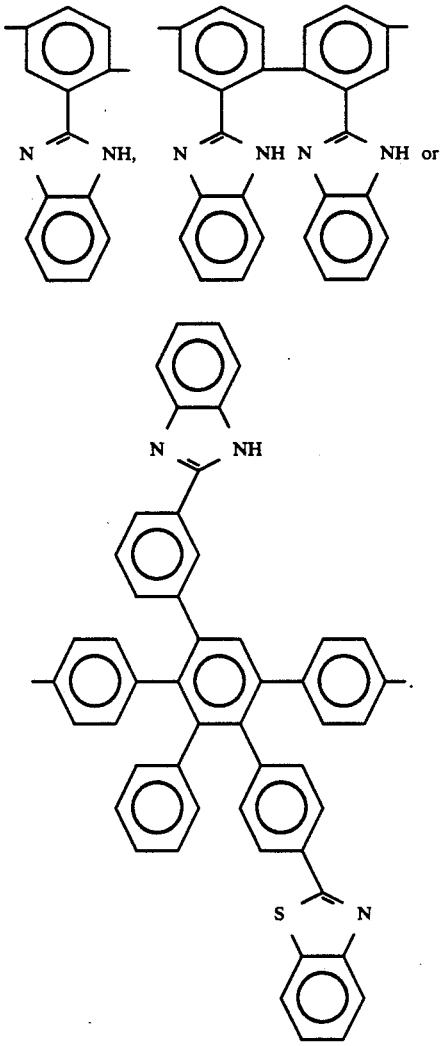

DESCRIPTION OF THE PREFERRED EMBODIMENTS

The polymers of this invention are prepared by the polycondensation of 4,6-diaminoresorcinol dihydrochloride, 2,5-diaminohydroquinoner dihydrochloride, 4,6-diamino-1,3-benzenedithiol dihydrochloride, 2,5-diamino-1,4-benzenedithiol dihydrochloride, or 1,2,4,5-tetraaminobenzene tetrahydrochloride and a para-oriented dicarboxylic acid of the formula HOOC-Ar-COOH, wherein Ar is as described previously.

Preparation of the para-oriented dicarboxylic acids is described in our co-pending application Ser. No. 07/686,203, filed of even date herewith, now U.S. Pat. No. 5,081,256.

The polycondensation is carried out in polyphosphoric acid (PPA). In carrying out the process, stoichiometric amounts of both monomers are heated at about 40°–80° C. in 77 percent PPA to effect thermal dehydrichlorination of the amino hydrochloride monomer. This step is carried out under reduced nitrogen pressure to facilitate removal of the hydrogen chloride. After complete dehydrochlorination, the temperature is lowered to about 50° C. and $P_2O_6$ is added to provide about 82–84% PPA. The reaction mixture is then slowly heated under a nitrogen atmosphere to about 190° C., at atmospheric pressure. In general, the concentration of monomers in the acid ranges from about 0.5 to 12.0 percent.

Alternatively, the amino hydrochloride monomer may be mixed with PPA, then heated, under vacuum or an inert gas atmosphere to about 40°-80° over a period of 3 to 24 hours to dehydrochlorinate the amino monomer. At the end of this period, the dicarboxylic acid is added. An additional amount of $P_2O_5$ and/or PPA may be added as required to provide a stirrable mixture and to increase the PPA concentration to about 82–84%.

Preferably, the polymerization is carried out in stages, i.e., a step-wise heating schedule is employed. Step-wise heating is preferred because immediately exposing the reaction mixture to relatively high polymerization temperature may cause decomposition of the monomers. The selection of a particular step-wise heating schedule is obvious to one of ordinary skill in the art. An exemplary heating schedule is 60° C. for 4 hours, 100° C. for 2 hours, 160° C. for 24 hours and 190° C. for 4 hours.

At the end of the reaction period, the polymer solution is in a very viscous or semi-solid state. After cooling, the product can be recovered by coagulation in water.

The molecular weight of these polymers is commonly indicated by the inherent viscosity of the polymer. The inherent viscosity is commonly determined at a concentration of 0.2 weight/volume percent in methanesulfonic acid (MSA) at 30° C.

The polymers produced in accordance with the invention may be used to produce fibers and sheets. In order to form these polymers into fibers or sheets, dopes are prepared containing about 5 to 15 weight percent of the polymer in a strong acid, such as sulfuric acid, MSA, chlorosulfuric acid, and the like, including mixtures thereof. Such dopes may be spun or extruded into a coagulation bath comprising water or a water/MSA mixture.

The following examples illustrate the invention:

EXAMPLE I

2-Benzimidazole phenyl polybenzothiazole

Into the bottom of a resin flask equipped with a mechanical stirrer, nitrogen inlet/outlet and pressure regulator, was placed 3.1094 g (11 mmol) of 2-benzimidazoleterephthalic acid, 2.7011 g (11 mmol) of 2,5-diamino-1,4-benzenedithiol dihydrochloride and 19.37 g of PPA (77% $P_2O_5$). The resulting mixture was dehydrochlorinated under reduced pressure (176 mm) while heating slowly to 65° C. The reaction temperature was maintained at 65° C. for 16 hours, raised to 80° C. for 4 hours, then cooled to 60° C. 10.73 g $P_2O_5$ was added to the mixture to bring the polymer concentration to 10 percent. The mixture was heated under nitrogen atmosphere at 60° C. for 4 hours, 100° C. for 2 hours and 160° C for 24 hours. As the temperature increased, stir opalescence began to occur at about 150° C. The mixture was finally heated to 190° C. for 4 hours. The polymer was precipitated in water, broken up with a blender, collected by suction filtration, washed with water and dried under reduced pressure (0.02 mm) at 100° C. Intrinsic viscosity, 11 dl/g.

Analysis calculated for $C_{21}H_{10}N_4S_2$: C, 65.95; H, 2.63; N, 14.65. Found: C, 64.89; H, 2.89; N, 14.48.

EXAMPLE II

Bisbenzimidazolyl biphenyl polybenzothiazole

Into the bottom of a resin flask equipped with a mechanical stirrer, nitrogen inlet/outlet and pressure regulator, was placed 4.7468 g (10 mmol) of 4,4'-dicarboxy-2,2'-bisbenzimidazolyl biphenyl, 2.4520 g (10 mmol) of 2,5-diamino-1,4-benzenedithiol dihydrochloride and 35.10 g of PPA (77% $P_2O_5$). The resulting mixture was dehydrochlorinated under reduced pressure (176 mm) while heating slowly to 65° C. The reaction temperature was maintained at 65° C. for 16 hours, raised to 80° C. for 4 hours, then cooled to 60° C. 15.90 g $P_2O_5$ was added to the mixture to bring the polymer concentration to 10 percent. The mixture was heated under nitrogen atmosphere at 60° C. for 4 hours, 100° C. for 2 hours and 160° C. for 24 hours. As the temperature increased, stir opalescence began to occur at about 140° C. The mixture was finally heated to 190° C. for 4 hours. The polymer was precipitated in water, broken up with a blender, collected by suction filtration, washed with water and dried under reduced pressure (0.02 mm) at 100° C. Intrinsic viscosity, 14 dl/g.

Analysis calculated for $C_{34}H_{18}N_6S_2$: C, 71.06; H, 3.16; N, 14.62. Found: C, 68.11; H, 3.25; N, 13.39.

EXAMPLE III

Benzimidazole terphenyl polybenzothiazole

Into the bottom of a resin flask equipped with a mechanical stirrer, nitrogen inlet/outlet and pressure regulator, was placed 0.6 g (7.5384 mmol) of 4,4''-dicarboxy-2'-phenyl-3'-{2-(4-phenylbenzthiazole)}-6'-{2-(3-phenylbenzimidazole)}-p-terphenyl, 0.1848 g (7.5384 mmol) of 2,5-diamino-1,4-benzenedithiol dihydrochloride and 66.82 g of PPA (83% $P_2O_5$). The resulting mixture was dehydrochlorinated under reduced pressure (176 mm) while heating slowly to 65° C. The reaction temperature was maintained at 65° C. for 16 hours, raised to 80° C. for 4 hours, then cooled to 60° C. 15.90 g $P_2O_5$ was added to the mixture to bring the polymer concentration to 10 percent. The mixture was heated under nitrogen atmosphere at 60° C. for 4 hours, 100° C. for 2 hours, 160° C. for 24 hours, and finally heated to 190° C. for 4 hours. The polymer was precipitated in water, broken up with a blender, collected by suction filtration, washed with water and dried under reduced pressure (0.02 mm) at 100° C. Intrinsic viscosity, 6.1 dl/g.

Analysis calculated for $C_{58}H_{33}N_5S_3$: C, 77.74; H, 3.71; N, 7.81. Found: C, 76.96; H, 3.38; N, 7.06.

Various modifications may be made to the invention as described without departing from the spirit of the invention or the scope of the appended claims.

WE CLAIM:

1. A para-ordered aromatic heterocyclic polymer having repeating units of the formula -(-Q-Ar-)- wherein Q is

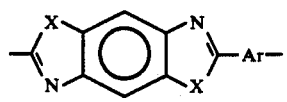

or

-continued
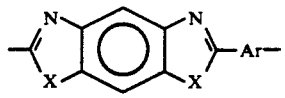
wherein X is —O—, —NH— or —S—, and wherein Ar is
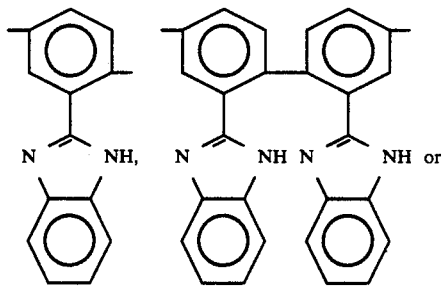
-continued
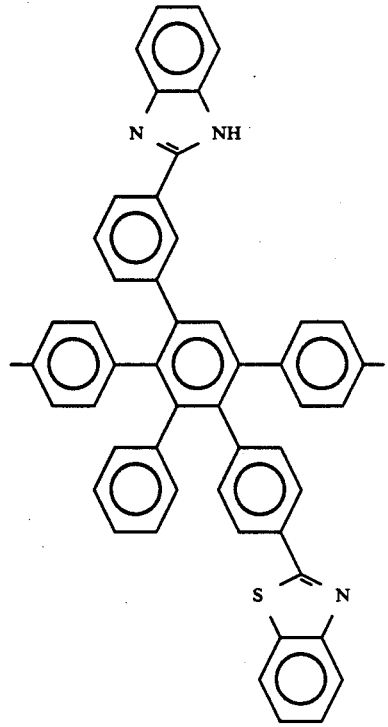
2. The polymer of claim 1 wherein X is —S— and wherein Ar is 2-benzimidazole.
3. The polymer of claim 1 wherein X is —S— and wherein Ar is bisbenzimidazolyl biphenyl.
4. The polymer of claim 1 wherein X is —S— and wherein Ar is 2′-phenyl-3′-{2-(4-phenylbenzthiazole}-6′-{2-(3-phenylbenzimidazole)}-p-terphenyl.
* * * * *

UNITED STATES PATENT AND TRADEMARK OFFICE
CERTIFICATE OF CORRECTION

PATENT NO. : 5,140,092

DATED : August 18, 1992

INVENTOR(S) : Fred E. Arnold et al

It is certified that error appears in the above-identified patent and that said Letters Patent is hereby corrected as shown below:

Column 2, line 49, "2,5-diaminohydroquinoner" should be
--2,5-diaminohydroquinone--.

Column 2, line 63, "dehydrichlorination" should be
--dehydrochlorination--.

Column 2, line 67, "$P_2O_6$" should be --$P_2O_5$--.

Signed and Sealed this

Thirty-first Day of August, 1993

*Attest:*

BRUCE LEHMAN

*Attesting Officer*  *Commissioner of Patents and Trademarks*